Jan. 28, 1969 R. E. SPIES 3,424,999
CRYSTAL OSCILLATOR AND CRYSTAL FILTER CIRCUIT
EMPLOYING A SINGLE CRYSTAL
Filed March 2, 1966
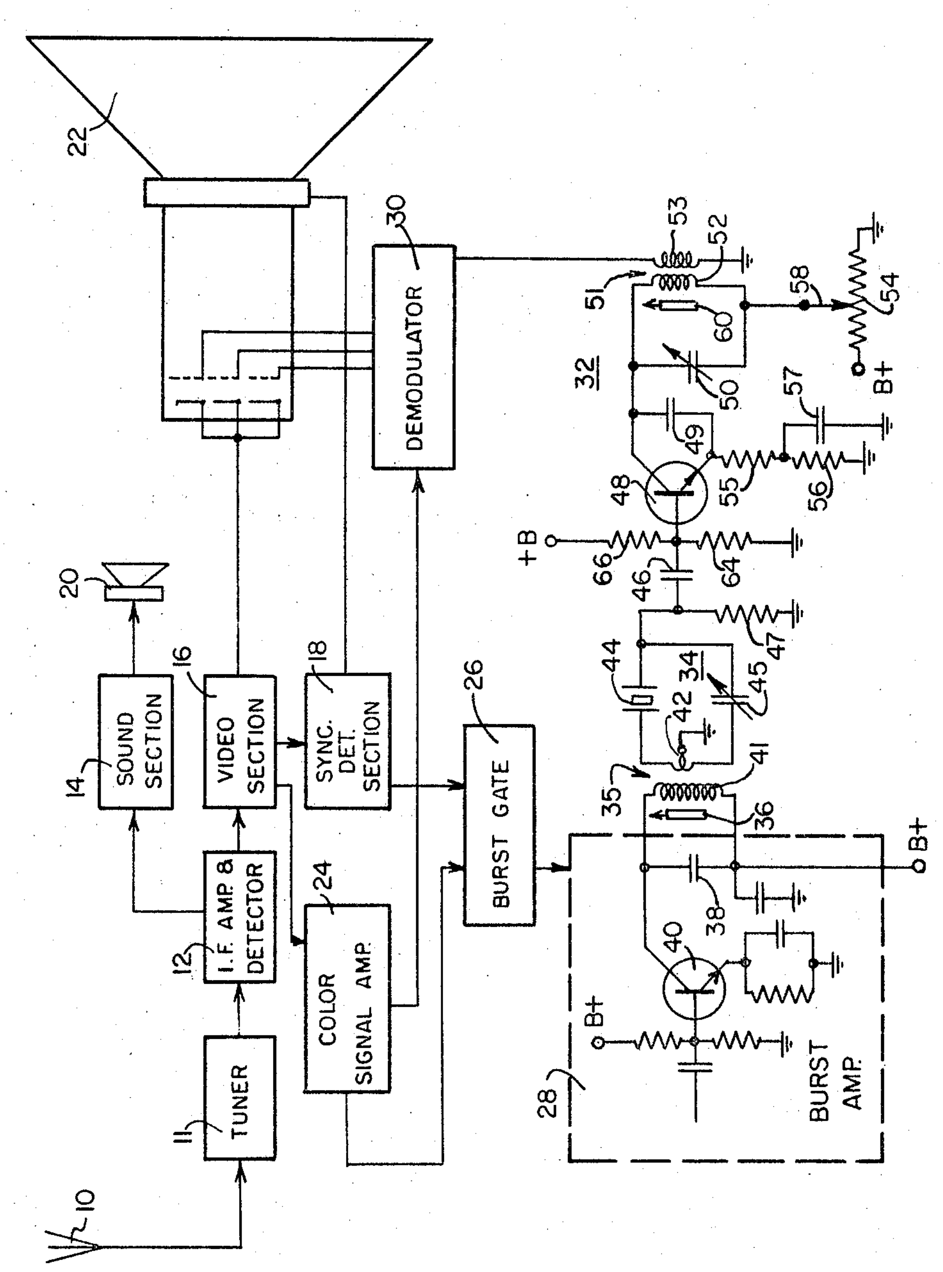
INVENTOR
ROLF E. SPIES
BY
Mueller, Aichele & Rauner
ATTYS.

United States Patent Office 3,424,999
Patented Jan. 28, 1969

3,424,999

CRYSTAL OSCILLATOR AND CRYSTAL FILTER CIRCUIT EMPLOYING A SINGLE CRYSTAL

Rolf E. Spies, Lyons, Ill., assignor to Motorola, Inc., Franklin Park, Ill., a corporation of Illinois Filed Mar. 2, 1966, Ser. No. 531,185
U.S. Cl. 331—116 4 Claims
Int. Cl. H03b 5/36

ABSTRACT OF THE DISCLOSURE

A common base oscillator circuit employs a crystal in the base circuit as the frequency determining element of the oscillator. The same crystal is used as part of a bridge filter circuit to couple synchronizing signals to the base of the transistor to synchronize the oscillator.

The composite color television signal includes a luminance component, a chrominance component and a color synchronizing component. The chrominance signal contains color difference signals which are demodulated by synchronous demodulation. In order to make the synchronous demodulation in the color television receiver possible, color synchronizing brusts are transmitted on the "back porch" of each horizontal blanking pulse of the color television signal. These color synchronizing bursts are used to synchronize a reference signal source to produce an output signal which has the frequency of the color subcarrier and a phase prescribed by the burst. For color fidelity it is important that the reference signal source is accurately synchronized and maintained at the phase prescribed by the burst. Without the color synchronizing signal the chrominance subcarrier demodulation process will not take place in the proper phase relationship, and the hue of the reproduced image will not correspond to that of the image as generated and transmitted.

A known type of burst synchronized oscillator circuit used in color television receivers is the injection locked type of oscillator wherein the color synchronizing bursts are applied to the oscillator control electrode from a crystal filter with the crystal tuned at its series resonant frequency. The cystal is part of the oscillator tank circuit and consequently determines the frequency of oscillation. In this circuitry noise elimination is not satisfactory although the oscillator is very stable. However, when the crystal filter is designed for a good noise cancellation the output of the filter has to be loaded with a low impedance. Since the input impedance of a following oscillator stage may be high, the low impedance filter would cause unstable oscillator operation.

Accordingly, it is an objet of the invention to provide an improved, inexpensive and very stable oscillator with a crystal filter of optimum design for determining the oscillation frequency.

It is another object of the invention to provide a burst filter which applies a signal to an oscillator control electrode having an input impedance which does not affect the noise cancellation of the filter.

It is another object of the invention to provide a crystal controlled, injection locked oscillator, the oscillation frequency and injection lock of which can be conveniently tuned in a wide range to the frequency of the color reference signal.

A feature of this invention is the provision of an injection locked crystal controlled color reference oscillator with a common electrode at which the burst signals are applied through a low impedance crystal filter with the crystal in its series mode.

A further feature of the invention is the provision of a transistorized grounded base oscillator with the grounded base being the input for the burst signals applied through a bridge filter loaded with a resistance in parallel to the input resistance of the oscillator for determining desirable noise bandwidth without losing gain.

The invention is illustrated in the drawing in which a combined crystal bridge filter and oscillator circuitry is shown.

In a specific form the invention may be used advantageously in any color television system for controlling the phase of a color reference signal which is generated in a transistorized color reference oscillator and synchronized by recurring burst signals. The oscillator part works in the grounded base mode and has a tuned output circuit coupled to the collector. A capacitor is coupled between the collector and emitter electrode to provide feedback. The base is grounded by means of a crystal which determines the oscillator frequency and at the same time, operates as part of a low impedance bridge filter. The bridge filter comprises an inductance coil of low impedance which is the secondary winding of a tuned burst amplifier output transformer providing synchronizing burst signals for the oscillator. The inductance coil provides one branch of the bridge and the crystal in series with a neutralizing capacitor provides the other one. The connection of the crystal and neutralizing capacitor is coupled to the base of the transistor, whereas the center tap of the inductor coil is grounded. The crystal is in series resonance at the burst signal frequency and provides a minimum impedance path from the base electrode through one part of the inductor coil to the ground.

Referring now to the drawing, there is illustrated a color television receiver incorporating the features of this invention. An antenna 10 receives the transmitted color television signal and couples it to tuner 11 which separates and converts the desired television signal from the other signals which may be present. The frequency converted color signal is amplified and detected in an IF amplifier and detector 12, and coupled to a sound section 14, video section 16 and a color signal amplifier 24. The output of sound section 14 is an audio signal which is coupled to speaker 20. The output of the video section 16 is a video signal which is coupled to picture tube 22, which may be a three-beam color tube or some other suitable color picture tube. The video signals developed in video section 16 are also coupled to synchronizing and deflection section 18, where the synchronizing signal is removed and deflection signals generated. The deflection signals are coupled to picture tube 22 to sweep the electron beam therein. A gating pulse at the horizontal deflection frequency is also developed by synchronizing and deflection section 18 and is coupled to burst gate stage 26.

The gating pulse at horizontal deflection frequency is present during the reception of the color synchronizing signal or burst so that burst gate 26 is turned on only when a color synchronizing signal is present. The chroma signal is applied to a color demodulator 30 and the synchronizing signal is applied to the burst amplifier.

A color reference signal oscillator 32 is coupled through a bridge filter 34 and a transformer 35 which can be tuned by means of core 36 and capacitor 38 to the burst amplifier 28. The separated bursts are applied to the input circuit of the burst amplifier 28 the output circuit of which comprises a transistor 40. The collector of transistor 40 is connected to a parallel resonance circuit consisting of capacitor 38 and the tuned primary winding 41 of transformer 35. The low impedance secondary bifilar winding 42 of transformer 35 provides one branch of the bridge filter 34, the center tap of which secondary winding is grounded. A crystal 44 in series with a neutralizing capacitor 45 forms the other branch of the bridge filter of which the junction of crystal 44 and capacitor 45 is connected through a coupling capacitor 46 to the input of oscillator 32. A resistor 47 which is small, for example 1000 ohms, in comparison to the input impedance of the oscillator 32 is connected from the junction of crystal 44 with capacitor 46 to ground.

The oscillator 32 comprises transistor 48, the collector of which is connected to a parallel resonant circuit of capacitor 50 and the primary winding 52 of transformer 51 which is tunable by means of core 60. The secondary winding 53 of transformer 51 is connected to the demodulator 30. The collector of the transistor 48 is further connected through a feedback capacitor 49 to the emitter, which is connected through a resistor 55 and a bias resistor 56 in parallel with a bypass capacitor 57 to ground potential. The direct current power supply is provided through a tap 58 of a potentiometer 54 which is connected between B+ and ground potential. The DC current supply for the base of transistor 48 is accomplished by a voltage divider having resistors 64 and 66.

The oscillator 32 works in the grounded base mode. The base is AC grounded by means of capacitor 46, crystal 44 and one-half of the low impedance secondary winding 42. The impedance of these parts in the base path is low e.g., between 50 and 150 ohms. The crystal determines the oscillation frequency and, at the same time, operates as part of the bridge filter 44 which is loaded by resistor 47 to provide best noise bandwidth. Thus, the bandpass response of the burst filter 34 as well as the frequency of the color reference oscillator 32 is controlled by only one single crystal which operates in both cases in its series mode.

The slight emitter degeneration by resistor 55 raises the input resistance of the oscillator to a degree that the bridge filter load is mainly determined by the fixed resistor 47 making the filter characteristic independent of transistor input parameter. The burst injection is accomplished by means of the secondary winding 42 which has only a few turns. Due to the low load resistance 47 of the bridge filter it is very easy to maintain the required narrow noise bandwidth without losing gain.

Crystal 44, the upper half of the center tapped secondary winding 42 of transformer 35, the lower half of the center tapped secondary winding 42 of transformer 35 and capacitor 45 form a bridge filter circuit. One terminal of the bridge is coupled to the base of transistor 48 while the opposite terminal of the bridge is coupled to a reference potential. The two remaining opposite corners of the bridge form the terminals of the secondary winding and can be considered as having a generator, represented by primary winding 41, coupled thereacross. Thus any signals appearing on primary winding 41 are coupled through the bridge filter circuit to the base of transformer 48. The filtering action of the bridge filter circuit is determined by the series resonance of crystal 44.

Transistor 48 has capacitor 49 connected between the output collector electrode and the input emitter electrode to provide an aperiodic feedback circuit. The base of transistor 48 is connected to the reference potential through crystal 44 which presents a low impedance at its series resonant frequency. Thus, the transistor 48, capacitor 49 and crystal 44 together with the remaining portions of the circuit form an oscillator the resonant frequency of which is determined by the series resonance frequency of crystal 44.

Synchronizing signals appearing on the primary winding 41 are coupled to the bridge filter circuit where they are filtered to remove signals which are outside the bandwidth of the crystal 44. Thus crystal 44 acts to remove noise signals from the synchronizing signal. The synchronizing signals are applied to the base of transistor 48 to regulate the conduction of transistor 48 in a manner which synchronizes the oscillation of the oscillator with the frequency of the synchronizing signals.

The crystal frequency can be changed within certain limits by varying the inductance of winding 41 by means of core 36 and the inductance of winding 52 by means of core 60.

For fine frequency control of the oscillator, it is feasible to use a fixed tuned transformer 51 and to vary the oscillation frequency by variation of the collector voltage by means of potentiometer 54.

I claim:

1. A transistorized oscillator circuit for generating a color reference signal for a color television receiver, including in combination, amplifier means having input, output and common terminals, aperiodic feedback means coupling said output terminal to said input terminal to form an oscillator circuit, crystal circuit means including a crystal coupling said common terminal to a reference potential, said crystal being series resonant at a particular frequency whereby said oscillator circuit oscillates at said particular frequency, synchronizing circuit means coupled to said crystal circuit means for providing a synchronizing signal at said particular frequency, said crystal acting to couple said synchronizing signal to said common terminal for synchronizing said oscillator circuit.

2. The transistorized oscillator circuit of claim 1 wherein said amplifier means includes a transistor having base, emitter and collector electrodes, said aperiodic feedback means is a capacitor coupling said emitter electrode to said collector electrode and wherein said common terminal is said base electrode.

3. The transistorized oscillator circuit of claim 2 wherein said crystal circuit means includes a transformer having a secondary winding with a center tap and a pair of terminals, said center tap being coupled to said reference potential, said crystal coupling one of said terminals to said base electrode and neutralizing capacitor means coupling the other of said terminals to said base electrode and to said crystal to form a bridge filter circuit, said transformer further having a primary winding coupled to said synchronizing circuit means.

4. The transistorized oscillator of claim 3 in which said bridge filter circuit includes a load resistor connected from said neutralizing capacitor means and said crystal to said reference potential.

References Cited

UNITED STATES PATENTS 2,948,774 8/1960 Singleback ---------- 178—69.5

ROY LAKE, *Primary Examiner.*

S. H. GRIMM, *Assistant Examiner.*

U.S. Cl. X.R.

178—5.4, 69.5; 331—172; 333—72